United States Patent [19]

Hozumi et al.

[11] 4,344,603
[45] Aug. 17, 1982

[54] ELECTROMAGNETIC VALVE APPARATUS WITH A HAND-OPERATED TRANSFER DEVICE

[75] Inventors: Kazuhiro Hozumi; Shigeo Tamaki, both of Asahi, Japan

[73] Assignee: Kuroda Precision Industries Ltd., Kawasaki, Japan

[21] Appl. No.: 179,642

[22] Filed: Aug. 20, 1980

[30] Foreign Application Priority Data

Aug. 31, 1979 [JP] Japan ........................... 54-121286[U]

[51] Int. Cl.³ .............................................. F16K 31/06
[52] U.S. Cl. .................................. 251/130; 137/625.65
[58] Field of Search ..................... 251/130; 137/625.65

[56] References Cited

U.S. PATENT DOCUMENTS 2,155,358  4/1939  Lyr ..................................... 251/130 X
3,351,093  11/1967  Frantz ............................. 137/625.27

FOREIGN PATENT DOCUMENTS 2158248  5/1973  Fed. Rep. of Germany .

Primary Examiner—Arnold Rosenthal
Attorney, Agent, or Firm—Fleit & Jacobson

[57] ABSTRACT

An improvement of an electromagnetic valve apparatus, in which a fluid passage is opened or closed by a movable iron core. The invention provides a hand-operated transfer device having a flat spring member with a large diameter annular element and a small diameter annular element, and an extended element which is connected with both annular elements at one portion. A hand operated member has an inner end which contacts an end of the extended element and is operable from the other end from the outside of the valve. Operation of the member results in movement of the iron core by the small diameter annular element.

11 Claims, 7 Drawing Figures

FIG. 4
FIG. 5
FIG. 6
FIG. 7
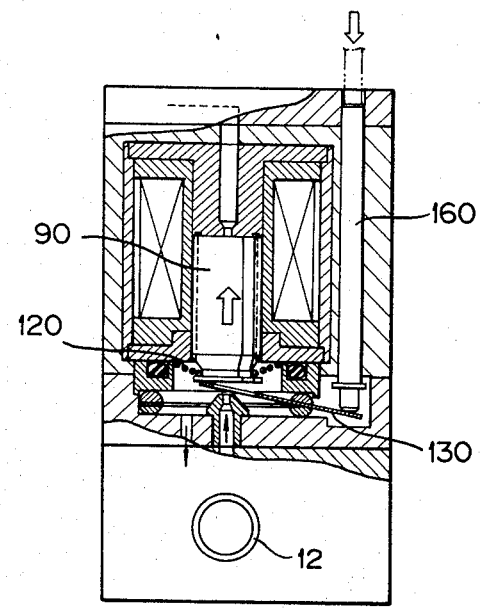
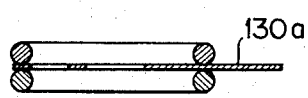
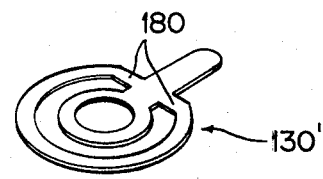
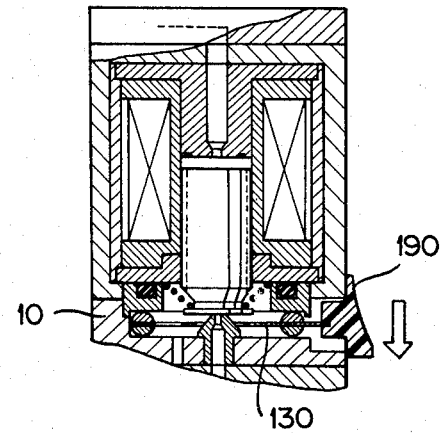

ELECTROMAGNETIC VALVE APPARATUS WITH A HAND-OPERATED TRANSFER DEVICE

BACKGROUND OF THE INVENTION

The invention relates to an improvement in electromagnetic valve apparatus with a hand-operated transfer device. The apparatus uses an iron core that is manually movable to open and shut fluid passages. Particularly, the present invention is an improvement of the hand-operated transfer device which comprises a bendable spring device with an inner and outer duplex member.

A conventional solenoid valve or an electromagnetic valve comprises generally a valve body and an electromagnetic element. The valve body has a valve chamber at an upper portion thereof, a fluid passage for supplying fluid to the chamber and another passage for discharge of the fluid from the valve chamber. A valve seat is fitted on an opening portion of the fluid passage for supplying fluid. The electromagnetic element of the valve comprises an electromagnetic coil, a fixed iron core, a movable iron core and a housing or cover. A fluid passage is provided in the fixed iron core. The movable iron core is downwardly pressed by a spring means and the lower surface of the core contacts with the upper surface of the valve seat and usually maintains closing condition thereof.

The conventional solenoid valve which includes the above stated elements will not appropriately operate when the electric current is interrupted. Therefore, some improvements are provided to the conventional electromagnetic valve, as shown in the Japanese Utility Model Application Publication Nos. 2607/1969, 2608/1969 and 2609/1969, in which a hand-operated transfer device is used to lift up the movable iron core for opening of the valve by means of respectively differently shaped cam means. However, these devices disclosed in the above stated prior art are of relatively large size and have complicated constructions, since the hand-operated member which operates the movable iron core extends horizontally against the axis line direction of the movable iron core.

SUMMARY OF THE INVENTION

The present invention of an electromagnetic valve or solenoid valve, which is provided with a hand-operated transfer device that directly opens or closes the fluid passage by means of the movable iron core, has a feature of operating a movable iron core by hand-operated exchanger or transfer device which includes a flat spring member. The flat spring means of the hand-operated transfer device comprises a large diameter annular element and a small diameter annular element which is concentrically positioned within the large diameter annular element, and an extended element connected with both annular elements at one portion and extending from the outer side of the large diameter annular element. The flat spring member is provided within the electromagnetic element and a valve chamber which is sealed by an elastic annular sealing ring by which the outer large diameter annular element is fixed.

An outer end of the extended element of the flat spring member is contacted by an end of an operative member which is provided on the side of the cover of the electromagnetic means or on the side of the valve body and moves parallel to the direction of movement of the movable iron core. Movement of the operative member moves the inner small diameter annular element which pushes the movable iron core in accordance with the elastic bent character of the extended element. The outer large diameter annular element, which is continued from the extended element and is fixed by the sealing member and, operates as a fulcrum.

Accordingly, a principal object of the present invention is to provide an electromagnetic valve that includes a hand-operated transfer device which operates vertically along the movable iron core.

Another object of the present invention is to provide an electromagnetic valve which includes a compact and simple hand-operated transfer device.

Other objects and many of the attendant advantages of this invention will be readily appreciated as the same become better understood by reference to the following description on basis of the attached drawings.

BRIEF DESCRIPTION OF THE DRAWINGS

The accompanying drawings illustrate the preferred embodiments of the present invention. In the drawings, the same reference numerals illustrate the same parts of the invention, in which:

FIG. 4 is a view, similar to FIG. 1, showing the condition in which the movable iron core is lifted up by the flat spring device, FIG. 5 is a cross sectional view of a second embodiment of assembled sealing rings, showing the flat spring member between the both rings.

FIG. 6 is an oblique sectional view of an another embodiment of the flat spring member, FIG. 7 is a view, partially in section, showing the second embodiment of the operative member connected to the outer end of the extended member.

THE DETAILED DESCRIPTION OF THE INVENTION

Figure 1:
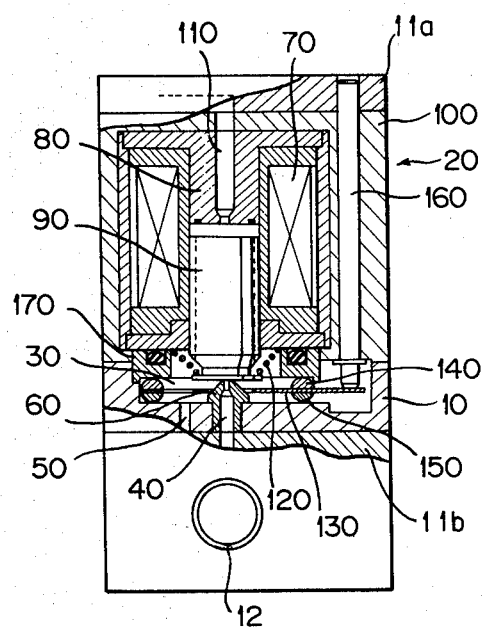
FIG. 1 is a front elevational view, partially in section, of the first embodiment of the present invention.

Attention is turned to the detailed description of the present invention as illustrated in the accompanying drawings wherein there is shown the preferred embodiment of the invention. With regard to one embodiment of the present invention shown in FIG. 1, which shows the improved electromagnetic valve or solenoid valve of the present invention, the valve apparatus is put between the base and top plate members 11b and 11a, respectively. The improvement is applied to a conventional electromagnetic valve which comprises a valve body 10 and an electromagnetic element 20. The valve body has a valve chamber 30 at the upper portion thereof, a fluid inflow passage 40 for supply of the fluid and an outlet passage 50, namely a fluid discharge passage, for discharge of the fluid. Also a valve seat 60 is fitted on the opening of the fluid passage 40. The electromagnetic element 20 comprises an electromagnetic coil 70, a fixed iron core 80, a movable iron core 90 and a housing or cover 100, a fluid passage 110 for discharge of the fluid is provided in the fixed iron core 80. A numeral 12 in the drawings shows a fluid pipe which connects with the fluid passage 40.

The movable iron core 90 is downwardly pressed by spring means 120 and the lower surface of the core 90 contacts with the upper surface of the valve seat 60. In FIG. 1, a condition is shown in which the valve closes the opening of the fluid passage 40.

The condition of FIG. 1 is that the fluid passage 40 is closed and the fluid passage 50 and the fluid passage 110 are communicated with each other. When an electric current is applied to the electromagnetic coil 70, the movable iron core 90 is upwardly attracted by the electromagnetic induction and the movable iron core leaves from the valve seat 60. Therefore, the fluid passage 110 for discharge of the fluid is closed by the movable iron core 90, and the both passages 40 and 50 communicate with each other, accordingly the fluid is supplied from the passage 40 to the passage 50.

The present invention has a further device for a hand-operated exchanger or transfer device in addition to the above stated electromagnetic valve apparatus. The hand-operated transfer device comprises a flat spring member 130 provided in the valve chamber 30, a pair of elastic sealing rings 140 and 150, and an operative member 160 that extends through cover 100 of the electromagnetic element.

Figure 2:
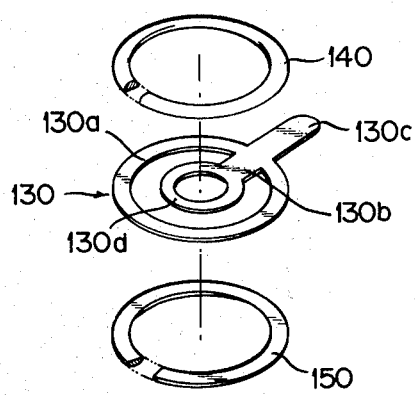
FIG. 2 is an exploded perspective showing the flat spring member and a pair of elastic annular sealing members, which are shown partially in section.

Also, in FIG. 2, the flat spring member 130 comprises a large diameter outer annular element 130a, namely an annular section, an extended element having projections 130b and 130c which respectively and crossingly project to both inner and outer sides from the outer annular portion 130a, and a small diameter inner annular element 130d which is concentrically positioned within the outer element 130a and is connected to the inner end of said projection 130b, and these elements are able to be formed as one body.

Also, the flat spring member 130 is able to be assembled from a separately formed outer annular element having a cutting portion thereon, and a separately formed inner annular element which has a projection which is pivotably engaged in the cutting out of the outer annular element and is springily held therein, however this modification is not shown in the drawings.

Both elastic annular sealing members 140 and 150 are formed as semicircular sections, as shown in section in FIG. 2. The section of the sealing member is shown for explanation of the shape of the cross sectional view thereof.

The flat spring member 130 is inserted between the sealing rings 140 and 150, namely, one of the sealing rings 140 and 150 is put on the upper surface of the outer annulation 130a and the other sealing ring is put under the lower surface of the outer annulation, and these rings are assembled and used as shown in FIG. 1. Also these elastic sealing rings are able to be respectively fixed on the both upper and lower surface of the outer large annulation by an adhesive agent. Instead of the semicircular shaped sealing rings, a pair of elastic O-rings are positioned on the upper and lower surface of the outer large annulation or the both surfaces of the large diameter annular element 130a, as illustrated in FIG. 5. The outer annulation is able to be covered by an elastic material to obtain the same sealing effects instead of the sealing ring. That is, the both surfaces of the large diameter annular element of the spring member are able to be coated with the elastic materials.

The valve seat 60 is positioned within the hole of the inner sealing ring element 130d which pushes the movable iron core 90.

The lower end of the operative member 160 is contacted with the projection 130c of the flat spring member 130.

In the drawings, the numeral 170 shows a nut which secures the flat spring member 130 and the elastic sealing members 140 and 150 in the valve chamber, and functions when the electromagnetic element 20 is fixed to the valve body by a threaded screw which is not shown in the drawings. This nut is able to be provided with the electromagnetic element as one body.

Figure 3:
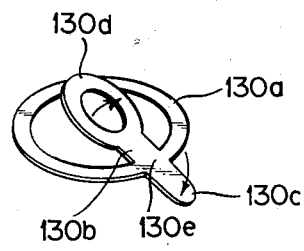
FIG. 3 is a perspective view of the flat spring member.

The function of the embodiments of the present invention is disclosed hereunder. In accordance with FIG. 3, when the large diameter annular element 130a is fixed by the sealing rings, and the projection 130c is resiliently bent in the downward direction by the force acting thereon, as indicated by an arrow head, the small diameter annular element 130d is also resiliently bent in the opposite direction, as indicated by an opposite arrow head by function of a fulcrum of the outer annulation 130a connecting with both projections 130b and 130c and the inner annulation 130d.

In FIG. 1 and FIG. 2, the operative member is vertically provided inside of the housing. On the other hand, in another embodiment of the operative member, the operative member 190 for the present invention is able to be provided on the outside of a wall of the valve apparatus.

In FIG. 7, a slot is provided in the side wall of the apparatus at in approximately horizontally extended part from the valve seat. An inner projection of the operative member is slidably inserted through the slot and the outer end of the projection of the flat spring member is fixed in the inner projection of the operative member.

This function of the flat spring member is one of the important features and distinguished notable function of the present invention. In FIG. 4, the condition of lifting up the movable iron core of the present embodiment shown in FIG. 1 is shown. From this condition, when the force on the operative member 160 is removed, the flat spring member 130 returns by the resilient force thereof to the condition shown in FIG. 1, and then the movable iron core 90 also returns by the force of the spring 120, as disclosed above, the present invention has the most important features on the flat spring member 130.

The base of the embodiment 130' of the outer annular element of the spring member connecting to the projection thereof is changed shape to straight, as shown by a numeral 180 in FIG. 6. In accordance with a test, the straightly shaped base has more effects on the strong force of restitution and on the long life.

Many prominent and excellent features of the present invention shall become manifest from the above description. The size of the elements is not limited and the size and shape thereof shall be changed and also considered in accordance with suitable requirements of the subject. Any change and other embodiments on design with regard to the electromagnetic valve apparatus shall be included in the scope of the claims of the present invention.

What is claimed is:

1. In an electromagnetic valve apparatus comprising a valve body, a valve chamber formed in the valve body and having a fluid inflow passage and a fluid discharge passage, a valve seat provided around an opening of the fluid inflow passage into the chamber, an electromagnetic member having a housing, an electromagnetic coil, a fixed iron core in which a fluid passage is provided, and a movable iron core, an end of the movable iron core being movable into contact with the valve seat to close the fluid inflow passage, the improvement comprising a hand-operated apparatus for moving the movable iron core away from the valve seat and comprising:

a flat spring member which comprises a large diameter annular element, an extended element which extends from the large diameter outer annular element and respectively projects to inner and outer sides thereof, and a small diameter inner annular element which is connected to an inner end of the extended element and is positioned within the outer annular element of the spring member;

elastic sealing means for fixedly securing the outer annular element of the spring member in the valve chamber; and an operative member which operatively contacts with an outer end of the extended element of the spring member for operating the flat spring member to lift up the movable iron core, and said inner annular element being resiliently bent by the extended element to push the movable iron core away from the valve seat, the outer annular element of the spring member operating as a fulcrum for the extended element when the outer end of the extended element is moved by the operative member.

2. The electromagnetic valve apparatus as in claim 1, wherein the outer annular element of the flat spring member has a straight base crossed by the extended element.

3. The electromagnetic valve apparatus as in claim 1, wherein the flat spring member is assembled from a separately formed outer annular element having a cut out portion and a separately formed inner annular element which has a projection which is pivotably engaged in the cut out portion of the outer element and is resiliently held therein.

4. The electromagnetic valve apparatus as in claim 1, wherein the valve seat is positioned within a hole of the inner annular element of the flat spring member and the inner annular element pushes the movable iron core when operated.

5. The electromagnetic valve apparatus as in claim 1, wherein the sealing means comprises a pair of elastic rings which have semicircular cross sections.

6. The electromagnetic valve apparatus as in claim 1, wherein the sealing means comprises a pair of elastic O-rings.

7. The electromagnetic valve apparatus as in claim 5 or 6, wherein the rings contact upper and lower surfaces, respectively, of the flat spring member.

8. The electromagnetic valve apparatus as in claim 1, wherein the sealing means comprises a coating of elastic material on upper and lower surfaces of the flat spring member.

9. The electromagnetic valve apparatus as in claim 1, wherein the operative member is a rod which is vertically provided within the housing so that a lower end thereof contacts the outer end of the extended element of the flat spring member, an upper end of the rod being operable from the outside of the housing.

10. The electromagnetic valve apparatus as in claim 1, wherein the operative member is a movable member slidably set in a slot provided through a side wall of the valve body, and the outer end of the extended element of the flat spring member being fixed in an inner projection of the operative member.

11. The electromagnetic valve apparatus as in claim 1, wherein the inner annular element is concentrically disposed within the outer annular element.

* * * * *